April 1, 1947.   A. HUNGERBÜHLER ET AL   2,418,261
PERMANENT BRAKE MAGNET FOR ELECTRICITY METERS
Filed July 31, 1943
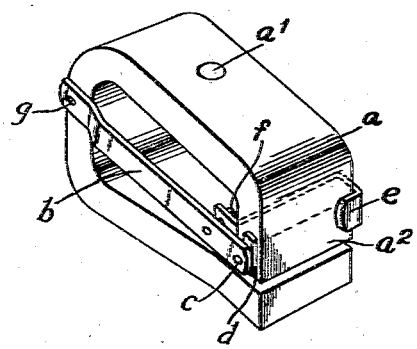
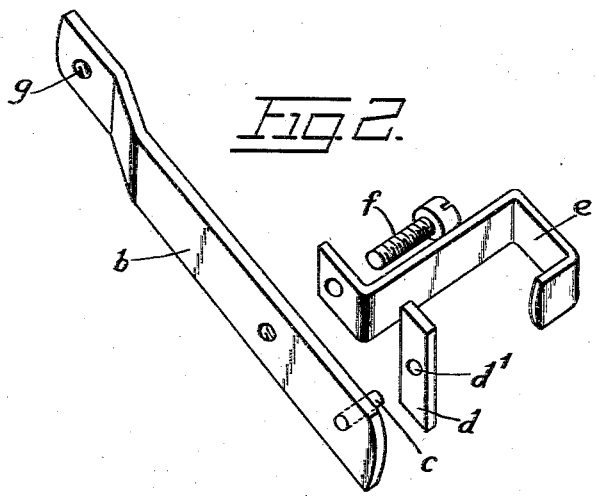
Inventors
AUGUST HUNGERBÜHLER, AND
WOLDEMAR LABHARDT.
By Morgan Finnegan and Durham
Attorneys Patented Apr. 1, 1947

2,418,261

UNITED STATES PATENT OFFICE 2,418,261

PERMANENT BRAKE MAGNET FOR ELECTRICITY METERS

August Hungerbühler, Zug, and Woldemar Labhardt, Zurich, Switzerland, assignors to Landis & Gyr, A. G., Zug, Switzerland, a body corporate of Switzerland Application July 31, 1943, Serial No. 496,970
In Switzerland November 30, 1942

3 Claims. (Cl. 171—34)

It is commonly known to provide permanent brake magnets for electricity meters with a device for rendering ineffective the influence of temperature fluctuations on the operation of the meter, that is to say by balancing out errors thus caused in the indications of electricity meters by altering the torque or brake moment in such a way that the rotations of the driving disk of the meters invariably remain proportional to the load. For this purpose material sensitive to changes of temperature has been employed which, for instance, is arranged on a bail connected in parallel to one pole of the brake magnet in order to be able to make full use of the pole surfaces (area A) respectively of the magnet mouth. This bail was attached by one of its ends to the magnet body and its free end was laid round the corresponding pole of the magnet and carried at the front of the magnet the temperature-sensitive material. The disposition round about the magnet pole of the bail end bearing the temperature-sensitive material was in itself unsatisfactory as it did not positively ensure a close contact of the temperature-sensitive material on the magnet body, and even more unfavourable was the manner of the only one sided attachment of the bail to the magnet body, particularly the use of the means employed for fastening the magnet to its support in the meter, i. e. a screw for simultaneously holding the bail on the magnet.

The object of the invention is to provide an improvement on brake magnets of the above mentioned kind and according to it the material connected in parallel to the pole forms a bridge over two leg parts lengthwise to the magnet body and keeps the temperature-sensitive material under mechanical tension adjacent to the magnet body.

The accompanying drawing illustrates but one form of embodiment incorporating the invention.

Fig. 1 is a perspective view showing a typical and illustrative embodiment of the invention; and Fig. 2 is likewise a perspective view of the parts allocated to the magnet by the compensating device.

Referring more particularly to the drawing, the letter $a$ designates a brake magnet with an opening $a^1$ for its attachment to the support of an electricity meter. $b$ denotes a flange made of magnetically conducting material extending lengthways to the magnet body between two leg-parts thereof thus forming a bridge, whereby the one leg-part is identical with the one pole $a^2$ of the magnet. On this pole $a^2$ the flange $b$ is pressed against a temperature-sensitive material in the shape of a small block $d$. This temperature-sensitive magnetic material constitutes a common thermal alloy whose permeability decreases with rising temperature.

The small block $d$ is pressed firmly to the one narrow side of the pole $a^2$ by a bail-shaped clamp or tensioning piece $e$, i. e. in such a way that the clamping bail $e$ clasps the other narrow side of the pole $a^2$ and is connected with the flange $b$ through a tension screw $f$. To prevent a displacement, the flange $b$ at the pole $a^2$ is together with the small block $d$ secured to the magnet body by means of a pin $c$ being set into the flange $b$; said pin protrudes an opening $d^1$ of the small block $d$ and engages a corresponding cavity or recess on the magnet body $a$. On the other contact leg of the magnet $a$, the flange $b$ is retained in its place by the engagement of a boss $g$—pressed out of the flange—with a corresponding recess on the magnet body.

Due to the fact that the flange laterally provided on the magnet body as shunt and holder of the temperature-sensitive material and that this flange acts upon said material by means of a tensioning piece, the fixture of this material becomes independent from that of the magnet in the meter, that is to say the positioning of the temperature-sensitive material adjacent to the magnet pole does not depend on the procedure of fastening the magnet in the meter, which means that when the magnet is fixed in the meter it is not necessary to see that the temperature-sensitive material gets well into contact with the magnet pole. By this method of fastening also an invariably good contact of the temperature-sensitive material with the magnet pole is achieved, as by means of the clamp $e$ and the connecting screw $f$ the flange $b$ is stressed to bending, thus pressing the material under tension against the pole.

The small block $d$ representing the temperature-sensitive material could also be disposed on the middle leg of the magnet instead of at a pole of the magnet, i. e. there, where according to the example of embodiment the boss $g$ is located, or there could be another block out of temperature-sensitive material besides that block $d$ close to the pole $a^2$.

Instead of only one flange $b$ with block $d$, there could be arranged such a flange with a block of temperature-sensitive material on either side of the magnet body, whereby a screw connecting the flanges through the space between the legs of the magnet body would give to the flanges the tensioning ensuring the good contact of the blocks with the magnet body. Also in this case the blocks made out of temperature-sensitive material may be fitted to one pole leg as well as to the middle leg of the magnet $a$, or such alloy blocks could be provided at both places.

The cavities or recesses on the magnet body may be created with the manufacture of the magnet body, for instance, in a die. Thereby the recesses may be designed with inward taper and the pin $c$ may be arranged with driving fit placed backward in the flange $b$. If the flange $b$ is fitted to the magnet body, the pin $c$ is placed forward in the flange what may be accomplished by pressure or impact action. Thereby the pin, which engages the recess already when the flange is attached to the magnet body, is guided by the wall of the recess thus centering the flange with the alloy block $d$ upon the cavity.

The loosening of the fixture of the temperature-sensitive material from the fixture of the magnet in the meter offers a further advantage in that the magnet with the temperature compensating device can be kept in stock mounted as a whole, so that when a meter is finished—as far as regards the brake magnet—only the regulating of the brake magnet to the running of the meter is required in spite of the temperature compensating device.

It will be understood that the embodiment hereinbefore described about the brake magnet under review has been given only by way of example and that the details thereof may be modified without departing beyond the scope of the invention and set forth in the appended claims.

What we claim is:

1. A permanent brake magnet for electricity meters with temperature sensitive material supported on the magnet in which a magnetically conducting strap extends from a pole piece to a central portion of the magnet at one side thereof and one end of said strap is spaced from the magnet by said material, a bail partially surrounding said pole piece, and a tensioning member connecting the bail to an intermediate portion of said strap to firmly press one end of the strap against the magnet and the other end against said material whereby it is securely contacted with the magnet.

2. A permanent brake magnet as claimed in claim 1 in which said tensioning member is a screw threaded into said magnetically conducting strap between its ends for tightening the clamp and pressing the bridge portion ends against the magnet.

3. A permanent brake magnet as claimed in claim 1 in which said magnetically conducting strap includes fastening means passing through the said strap into the magnet for additionally securing the bridge portion to the magnet.

AUGUST HUNGERBÜHLER.
WOLDEMAR LABHARDT.

REFERENCES CITED

The following references are of record in the file of this patent:

UNITED STATES PATENTS

| Number | Name | Date |
|---|---|---|
| 1,702,457 | Wall | Feb. 19, 1929 |
| 2,196,898 | Faus | Apr. 9, 1940 |
| 2,309,414 | Nobbs | Jan. 26, 1943 |
| 1,737,506 | McCraiken | Nov. 26, 1929 |

FOREIGN PATENTS

| Number | Country | Date |
|---|---|---|
| 385,723 | British | Jan. 5, 1933 |